(12) United States Patent
Pfeffer

(10) Patent No.: US 7,862,669 B2
(45) Date of Patent: Jan. 4, 2011

(54) METHOD OF INSULATION FORMATION AND APPLICATION

(75) Inventor: Jack R. Pfeffer, Eagle, ID (US)

(73) Assignee: UPF Corporation, Bakersfield, CA (US)

( * ) Notice: Subject to any disclaimer, the term of this patent is extended or adjusted under 35 U.S.C. 154(b) by 1049 days.

(21) Appl. No.: 11/545,046

(22) Filed: Oct. 10, 2006

(65) Prior Publication Data

US 2007/0031647 A1 Feb. 8, 2007

Related U.S. Application Data

(63) Continuation-in-part of application No. 10/340,889, filed on Jan. 13, 2003, now abandoned.

(51) Int. Cl.
*B32B 17/04* (2006.01)
*B29C 65/00* (2006.01)

(52) U.S. Cl. .................................. 156/62.2

(58) Field of Classification Search ............ 156/62.2, 156/62.4, 182; 264/113, 115, 123
See application file for complete search history.

(56) References Cited

U.S. PATENT DOCUMENTS 3,215,585 A * 11/1965 Kneipple ............ 65/451
3,620,906 A * 11/1971 Hannes ............. 428/339
3,824,086 A * 7/1974 Perry et al. ........... 65/522
4,201,247 A * 5/1980 Shannon ............ 138/141
6,294,491 B1 * 9/2001 Fay et al. ............ 501/35
6,811,649 B2 11/2004 Pfeffer
2003/0228820 A1 * 12/2003 Pfeffer ............ 442/180

* cited by examiner

*Primary Examiner*—Michael A Tolin
(74) *Attorney, Agent, or Firm*—William W. Haefliger

(57) ABSTRACT

The method of forming a lightweight, high performance, glass fiber blanket for acoustical and thermal insulation, that includes treating glass fibers with a fluid binding agent at elevated temperature to form a first cohesive glass fiber layer of thickness $t_1$ traveling endwise, and winding that layer into a roll above a travel zone of that layer, repeating said treating to form a second cohesive glass fiber layer of thickness $t_2$ traveling endwise over said zone below said roll and into an oven, and unrolling said first layer from said roll to travel into the oven in overlying surface to surface contacting relation to the traveling second layer, subjecting said layers to heat treatment and pressurization in the oven to compress the first and second layers to a controlled density thickness $t_3$ which is substantially less than $t_1$ and $t_2$, and to progressively bond said first and second layers together in laminated relation to form the blanket, and removing said laminated product from the oven.

7 Claims, 3 Drawing Sheets

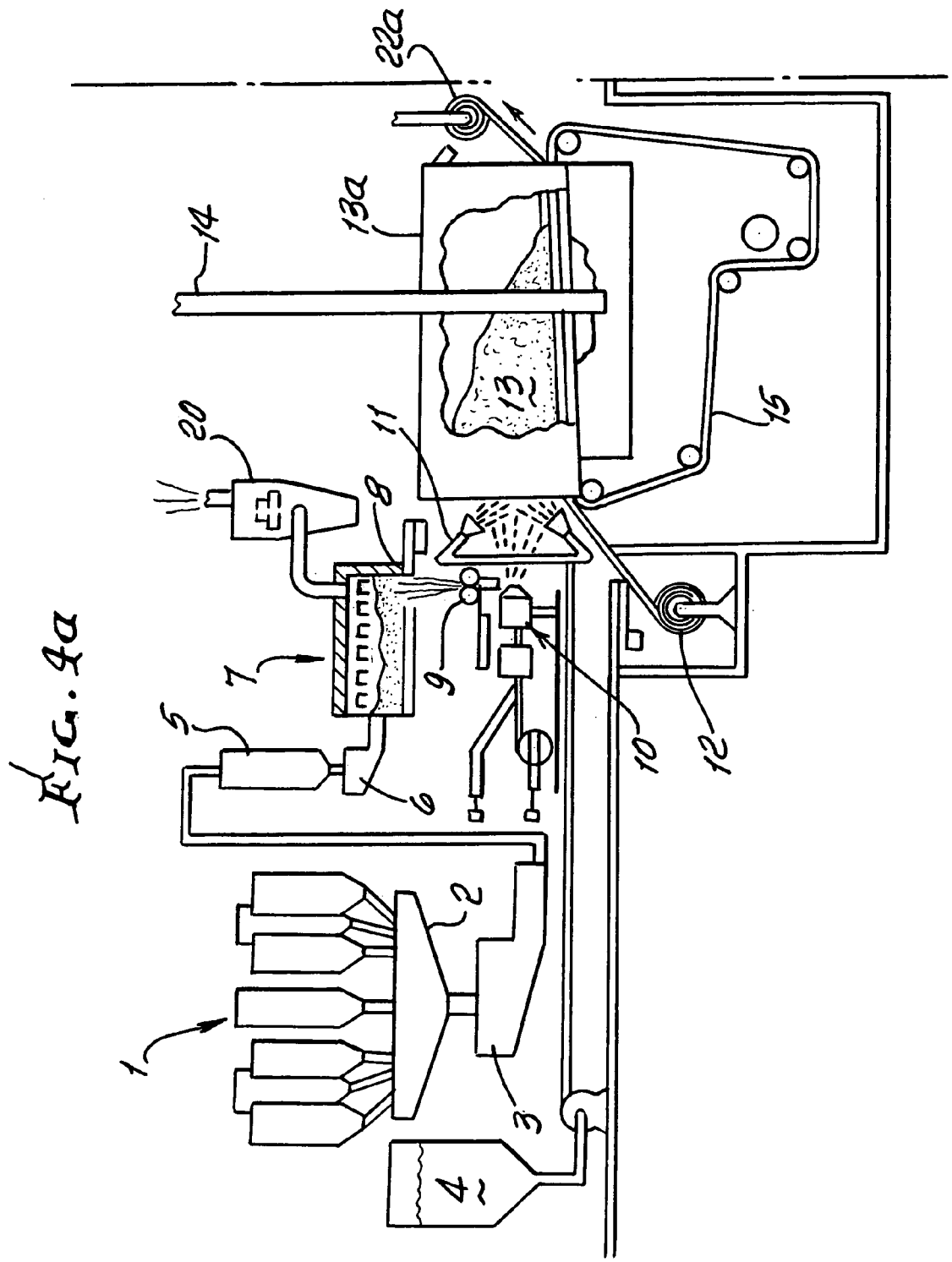

METHOD OF INSULATION FORMATION AND APPLICATION

This application is a continuation-in-part of U.S. application Ser. No. 10/340,889, filed Jan. 13, 2003 now abandoned.

BACKGROUND OF THE INVENTION

This invention relates generally to provision and use of a lightweight, high performance, glass fiber blanket employed in aircraft and marine applications to provide thermal and acoustical insulation; and more particularly concerns an improved method of producing that blanket.

For many years aircraft original equipment manufacturers (OEMs) have employed a light weight, high performance, and special fiberglass for thermal and acoustical insulation. This insulation is typically 1 inch, 0.42 pounds per cubic foot (pcf); 1 inch, 0.60 pcf; and ⅜ inch, 1.5 pcf.

The insulation is sold to the OEMs or their fabricators.

Typically, three layers of 1 inch material are stacked together and encapsulated in a light weight Mylar film. The finished blanket, approximately 3 inches thick, is installed in the aircraft by a series of plastic pins that penetrate the insulation and are then fastened to the aircraft interior. Caps and washers are placed over the pins to secure the aircraft blanket in place. During this process, the insulation is often compressed. Because the 3 inch blanket is only 0.42 pcf, it is relatively limp and requires several pins for sidewall and overhead installations to prevent sagging.

There is need for an improved process and product which provides the following advantages:
1. The fabricator only needs to handle one layer of material instead of multiple layers.
2. Shipping and storage of material requires less space.
3. A density product ia more rigid and could be fully or partially friction fitted. This requires fewer pins for application which, in turn, reduces installed weight per square foot. This is the OEMs primary objective.
4. Requires less space in the interior of the aircraft for insulation which is very critical in smaller regional aircraft.

SUMMARY OF THE INVENTION

It is a major object of the invention to provide a highly affective, and unusually advantageous process and product meeting the above needs. Basically the unusually advantageous method of forming the needed lightweight, high performance, glass fiber blanket for acoustical and thermal insulation, includes the steps:

a) treating glass fibers with a fluid bonding agent at elevated temperature to form a first cohesive glass fiber layer of thickness $t_1$ traveling endwise, and winding that layer into a roll above a travel zone of that layer, b) repeating said treating to form a second cohesive glass fiber layer of thickness $t_2$ traveling endwise over said zone below said roll and into an oven, and unrolling said first layer from the roll to travel into the oven in overlying surface to surface contacting relation to the traveling second layer, c) subjecting said layers to heat treatment and pressurization in the oven to compress the first and second layers to a controlled higher density thickness $t_3$ which is substantially less than $t_1$ and $t_2$, and progressively bonding said first and second layers together in laminated relation to form the blanket, d) and removing the laminated product from the oven.

Typically, $t_3$ is between about 1 inch and 1½ inch, and has about 0.105 pounds per square foot weight; and the weight per cubic foot of the product is one of the following:
i) 0.84
ii) 1.26.

As will be seen, the resultant blanket form product is highly useful in application as insulation for aircraft, as in fuselages for example, and the method of installation includes the steps
i) installing the blanket as insulation to an aircraft wall structure,
ii) and providing plastic retention pins, effecting penetration of the pins through the blanket, and securing the pins to said structure.

It is a further object to provide and operate endless conveyor means to contact and convey the first and second layers through the oven; and to slit the produced, conveyor delivered laminated blanket into controlled width sections enabling direct installation into aircraft, as referred to.

These and other objects and advantages of the invention, as well as the details of an illustrative embodiment, will be more fully understood from the following specification and drawings, in which:

DRAWING DESCRIPTION

FIGS. 4*a* and 4*b* are elevations showing further details of product formation.

DETAILED DESCRIPTION

Figure 1:
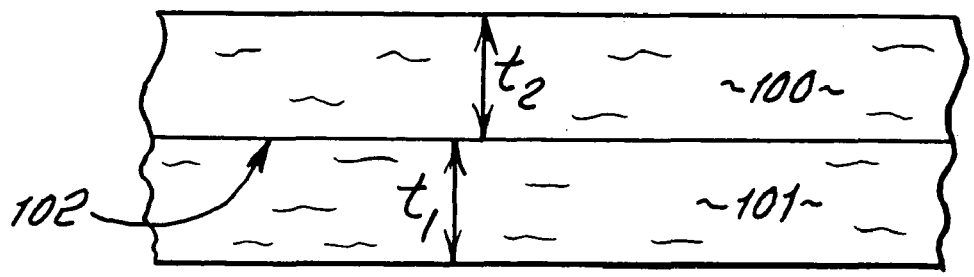
FIG. 1 is a sectional view taken through overlying insulative blankets.

Referring first to FIG. 1, it shows two glass fiber layers 100 and 101 extending in face-to-face relation at 102, and having thicknesses $t_1$ and $t_2$ which are preferably, but not necessarily the same. Each of the layers 100 and 101 consists essentially of glass fibers generally uniformly distributed in a resinous binder, which upon heating as in FIG. 2, becomes cured to bind the layers 100 and 101 together, at interface 106.

The glass fibers in each layer typically have cross dimensions, as for example diameters, between 2.0 and 9.0 HT, where HT=0.00001 inch. The bulk of the glass fibers have lengths between 1 and 2 microns.

The total thickness $t_1$ and $t_2$ of the layers in FIG. 1 is preferably about 3 inches.

Figure 2:
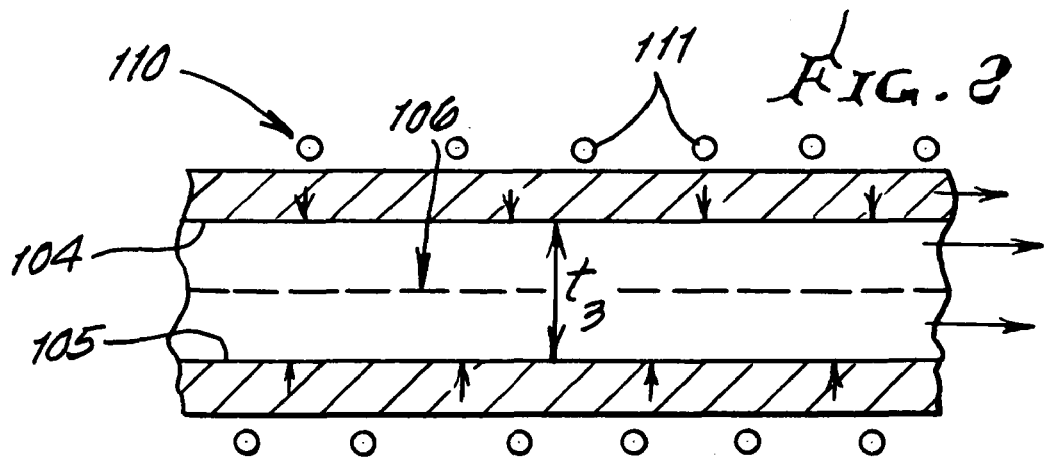
FIG. 2 is a view showing the two FIG. 1 blankets during reduction in thickness and bonding.

FIG. 2 is like FIG. 1, except that the layers are being compressed and heated in an oven between surfaces 104 and 105, and to reduced thickness $t_3$. The resultant cured resinous bond between the layers is located at 106.

The elevated curing temperature is typically about 425° F., for binder resin consisting of Phenol Formaldehyde, Melamine and/or other thermal/set resins. Drying and curing at such elevated temperature or temperatures is completed during a time interval between 2 and 4 minutes. The layers are preferably traveled endwise through a curing oven 110 (see heating elements 111) for that purpose, and thereafter the product blanket is slit into strips, as may be required. The strips may then be cut into sections for use in application to aircraft structure such as frames. See FIG. 3.

Figure 4B:
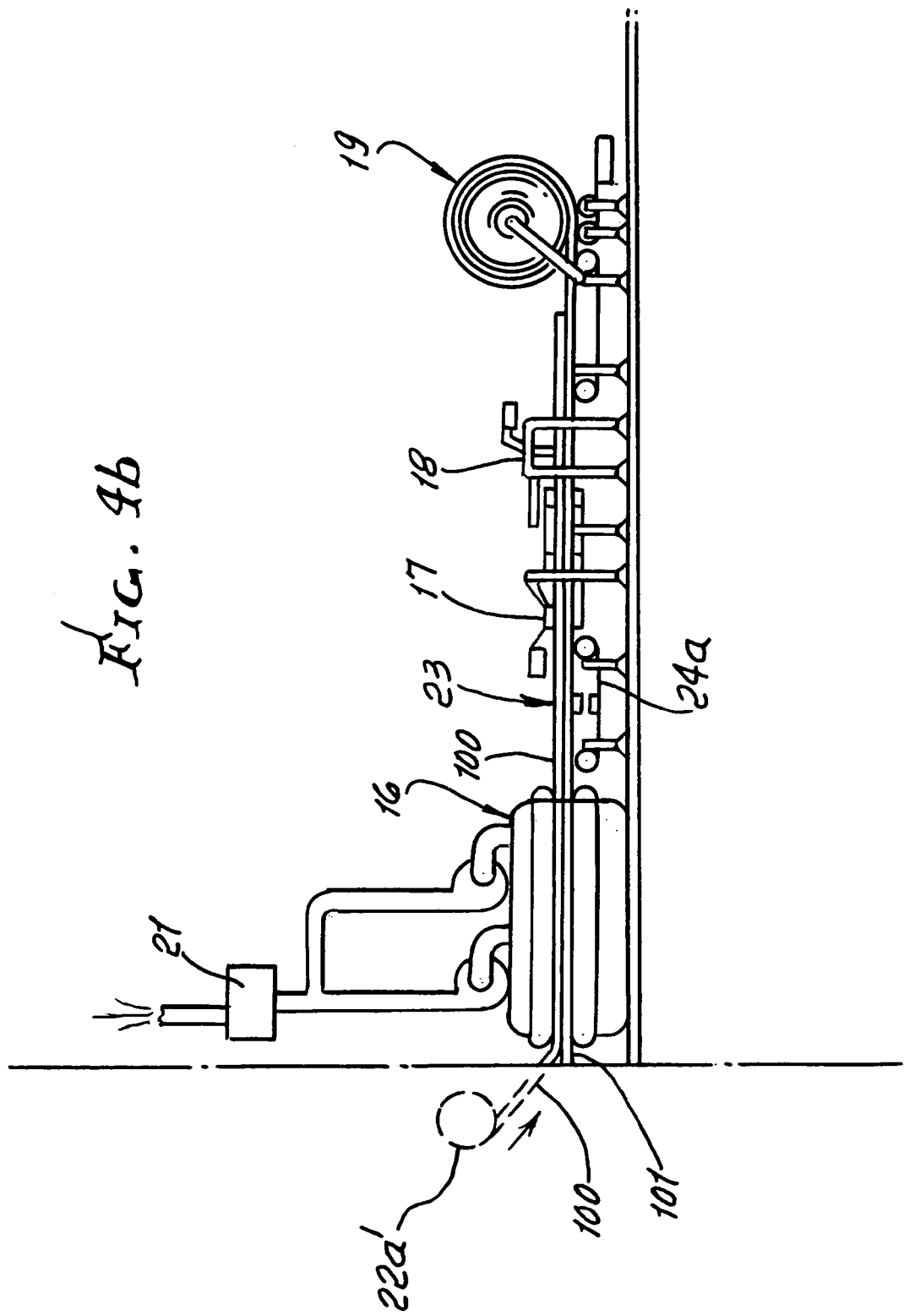

FIGS. 4a and 4b show the complete, flame attenuation process, with numerals 1-22 applied to elements or steps of the process. Such numerals identify the following:

1. holding tanks for batch glass ingredients
2. batch weighing and mixing apparatus
3. batch transport apparatus
4. binder resin tank
5. batch holding tank, proximate furnace
6. apparatus to feed bath ingredients from tank 5 to furnace 7
7. furnace operated at or near 2450° F., for example
8. bushings (typically consisting of platinum and rhodium) through which molten glass flows from furnace, at about 1750° F.
9. rolls to pull glass through bushings, to produce fibers
10. burners, for producing hot gas jets to melt the fibers, to attenuate them into finer fibers displaced or blown rightwardly (see U.S. Pat. No. 5,389,121) to mix with binder resin, sprayed at 11
11. binder spray nozzles receiving binder pumped from 4
12. roll, feeding backer sheet to travel rightwardly on chain conveyor 15, within enclosure 13a, to support the homogenized (mixed) glass fibers and binder resin, collecting at 13
13. homogenized mix collection
14. forming fans
15. chain conveyor
16. curing oven through which formed layers travel and laminate (see layers 100 and 100a, in FIG. 2)
17. slitters, to slit cured product into strips
18. choppers to cut strips to selected length
19. roll-up roll, for roll-up of product sheet as in FIG. 4a. FIG. 4b shows unrolling of the rolled first sheet 100 onto second sheet 101 being formed and fed to curing oven 16
20. furnace air pollution control and treating apparatus
21. oven gas pollution control and treating apparatus
22a. roll of rolled up first (upper layer 100 (see FIG. 4a)
22a'. roll 22a being unrolled (see FIG. 4b) to feed layer 100 onto layer 101
23. laminated composite product traveling on conveyor 24a, toward slitters 17.

Figure 3:
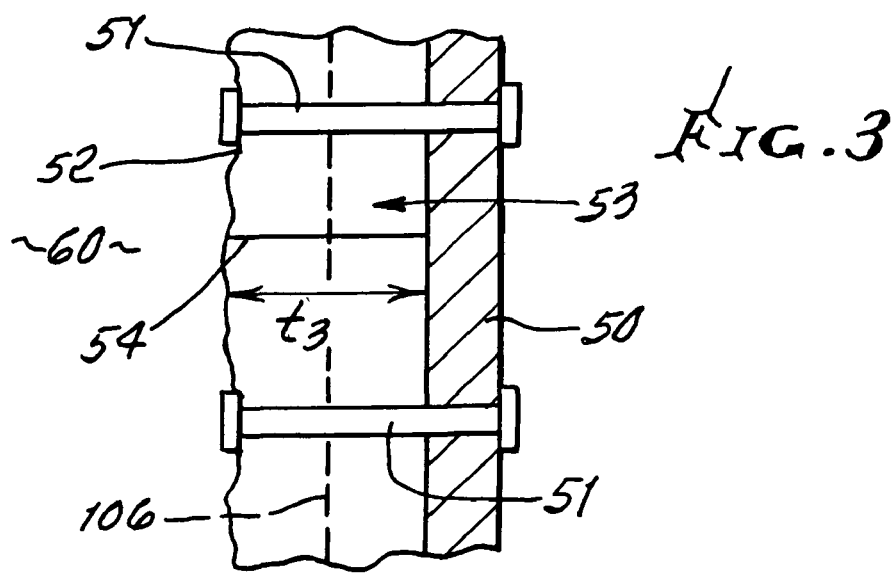
FIG. 3 is a section showing installation of the product composite insulation to aircraft structure.

The resultant laminated blanket product indicated at 120 in FIG. 3 is in one layer, and typically replaces the need for three layers. For example, the density of the product is typically, but not limited to the following:

0.84 pound per cubic foot (pcf) where $t_3$ is 1½ inches, or 1.26 pcf where $t_3$=1 inch.

In each of the above, the density of the original layers 100 and 101 is 0.42 pcf (three inches total original thickness $t_1$ to $t_2$).

In each of the above the weight per square foot of the product is 0.105 lbs.

Accordingly, the weight per square foot of the layer 100 unrolled from the base roll is 0.0525; and the weight per square foot of the layer 101 being produced (in FIGS. 4a and 4b) is 0.0525.

The top oven conveyor is then set to 1½". The base roll is unrolled on top of the material being produced and both layers are fed into the oven. As both layers contain uncured resin, the two layers are laminated into one finished layer, being bonded by the resin being cured in the oven.

The finished product is then slit to the proper width and rolled.

FIG. 3 shows application of the composite product to aircraft frame or support structure 50, which may be metallic, as by fasteners at 51, to protect structure 50. Note that the composite blanket is locally compressed at 52, as by such fasteners. The composite itself is openly exposed to aircraft interior zone 60. Sections 53 of the composite completely and openly cover selected areas defined by the frame. The sections 53 may be installed in abutting edge-to-edge configuration, as at 54.

I claim:

1. The method of forming a lightweight, high performance, glass fiber product blanket for acoustical and thermal insulation, that includes:
    a) treating glass fibers with a fluid binding agent at elevated temperature in an oven to form a first cohesive glass fiber layer of thickness $t_1$ traveling endwise, and winding that layer into a roll above a travel zone of that layer,
    b) repeating said treating to form a second cohesive glass fiber layer of thickness $t_2$ traveling endwise over said zone below said roll and into an oven on a conveyor, and unrolling said first layer from its said roll to travel into the oven in overlying surface to surface contacting relation to the traveling second layer,
    c) subjecting said overlying layers to simultaneous heat treatment and pressurization in the oven to compress the first and second layers to a controlled density thickness $t_3$ which is substantially less than $t_1$ and $t_2$, and to progressively bond said first and second layers together in laminated relation to form the product blanket,
    d) and removing said laminated product from the oven,
    e) and wherein the glass fibers in each layer have cross dimensions between 2.0 and 9.90 HT, where HT=0.00001 inch, the bulk of the fibers having lengths between 1 and 2 microns.

2. The method of claim 1 including slitting said laminated blanket into controlled width sections.

3. The method of claim 1 wherein $t_3$ is between about 1 inch and 1½ inch, and having about 0.105 pounds per square foot weight.

4. The method of claim 3 wherein the weight per cubic foot of the product is about one of the following:
    i) 0.84
    ii) 1.26.

5. The method of clam 1 including providing and operating endless conveyor means to contact and convey the first and second layers through the oven.

6. The method of claim 1 wherein the bonding agent is a phenolic resin sprayed into a falling stream of said glass fibers.

7. The method of using the product blankets of claim 1, that includes:
    i) installing the blankets as insulation to an aircraft or marine wall structure,
    ii) and providing plastic retention pins, effecting penetration of the pins through each blanket, and securing the pins to said structure,
    iii) and wherein each blanket has exposed ends defining edges, and including effecting edge-to-edge contact of the edges of adjacent blankets.

* * * * *